(12) United States Patent
Liu et al.

(10) Patent No.: US 12,438,797 B2
(45) Date of Patent: Oct. 7, 2025

(54) NETWORK END-TO-END TRAFFIC FLOW STATISTICS FROM ARBITRARY NETWORK LOCATION

(71) Applicant: Cisco Technology, Inc., San Jose, CA (US)

(72) Inventors: Jianda Liu, Shanghai (CN); Xiao-Rong Wang, Shanghai (CN); Hongbo Xia, Shanghai (CN); Jiayi You, Shanghai (CN); Yu Zhang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 18/099,104

(22) Filed: Jan. 19, 2023

(65) Prior Publication Data

US 2024/0056373 A1    Feb. 15, 2024

Related U.S. Application Data

(60) Provisional application No. 63/397,100, filed on Aug. 11, 2022.

(51) Int. Cl.
*H04L 43/10* (2022.01)
*H04L 43/0876* (2022.01)

(52) U.S. Cl.
CPC .......... *H04L 43/10* (2013.01); *H04L 43/0876* (2013.01)

(58) Field of Classification Search
CPC ......... H04L 45/70; H04L 45/26; H04L 45/48; H04L 45/02; H04L 43/10; H04L 43/0817; H04L 43/06; H04L 43/04; H04L 43/0852; H04L 47/20; H04L 49/25; H04L 41/24
See application file for complete search history.

(56) References Cited

U.S. PATENT DOCUMENTS

| | | | |
|---|---|---|---|
| 12,088,471 B2* | 9/2024 | Yin | H04L 45/02 |
| 2017/0237653 A1* | 8/2017 | Agarwal | H04L 45/70 370/254 |
| 2022/0045927 A1 | 2/2022 | Liu et al. | |
| 2022/0158924 A1* | 5/2022 | Ramaswamy | H04L 43/10 |
| 2022/0247677 A1 | 8/2022 | Baruah et al. | |

FOREIGN PATENT DOCUMENTS

| | | |
|---|---|---|
| CN | 111245644 A | 6/2020 |
| WO | WO2016177205 A1 | 11/2016 |

* cited by examiner

*Primary Examiner* — Mahran Y Abu Roumi
(74) *Attorney, Agent, or Firm* — Lee & Hayes, P.C.

(57) ABSTRACT

Techniques and architecture are described for tracking flows of packets in a network using a packet color marking scheme for obtaining network end-to-end traffic flow metrics in the network. In particular, in configurations, a user may be prompted to specify a site and a virtual private network (VPN) at which to start a trace for packet flows using a coloring marking scheme within the network. Given the VPN and the site, it is possible to monitor interested packet flows and apply metadata, e.g., colors, on flow packets. Remote wide area network (e.g., software defined WAN (SD-WAN)) routers receiving the packets with metadata may automatically trace the same flow and apply the same metadata to a next hop router. Hence, an end-to-end network path may be discovered.

20 Claims, 5 Drawing Sheets

NETWORK END-TO-END TRAFFIC FLOW STATISTICS FROM ARBITRARY NETWORK LOCATION

CROSS-REFERENCE TO RELATED APPLICATION

This patent application claims priority to U.S. Provisional Patent Application No. 63/397,100, filed Aug. 11, 2022, which is fully incorporated herein by reference.

TECHNICAL FIELD

The present disclosure relates generally to tracking packets in a network and more particularly, to tracking flow of packets in the network using a packet color marking scheme for obtaining network end-to-end traffic flow metrics in the network.

BACKGROUND

In networks, packets traverse through various nodes, e.g., network devices such as, for example, routers, switches, etc. Often, packets may enter and exit wide area networks (WANs) via service local area networks (LANs). The packets generally enter the WAN and exit the WAN via edge routers. In between the edge routers are generally many other intermediate routers, often referred to as next hops. The packets propagating through the WAN may originate from specific applications (apps). Since the WAN is generally a large, complex network in the form of a web, it may be difficult for a user using an app that propagates a series of packets through the WAN to know if all of the packets of a particular stream (flow) of packets reach their destination, e.g., exit the WAN via an appropriate edge node and enter an appropriate service LAN. For example, packets may be dropped, delayed, re-ordered (mis-ordered), etc.

Request for Comments (RFC) 8321 provides an alternate marking (coloring) method for passive hybrid performance monitoring of network traffic since many service providers' networks carry traffic with contents that are highly sensitive to packet loss, delay and jitter. RFC8321 provides a method that is a passive performance monitoring technique, potentially applicable to any kind of packet-based traffic including Ethernet, Internet Protocol (IP), and multi-protocol label switching (MPLS), both unicast and multicast. Thus, in accordance with RFC8321, colors may be used to mark packets belonging to sets of packet flows. A same color may be assigned to packets in a fixed interval and then the color may be changed to a different color for packets in a next interval. Whenever the color changes, the color may be used as a signal of terminating previous intervals and starting a new interval. However, these techniques provide several problems. For example, a problem may include how to mark network-wide and end-to-end color marking to interested packets without globally enabling the marking mechanism. Another example of a problem includes how to advertise color changes from intermediate nodes and still maintain a synchronized counting.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
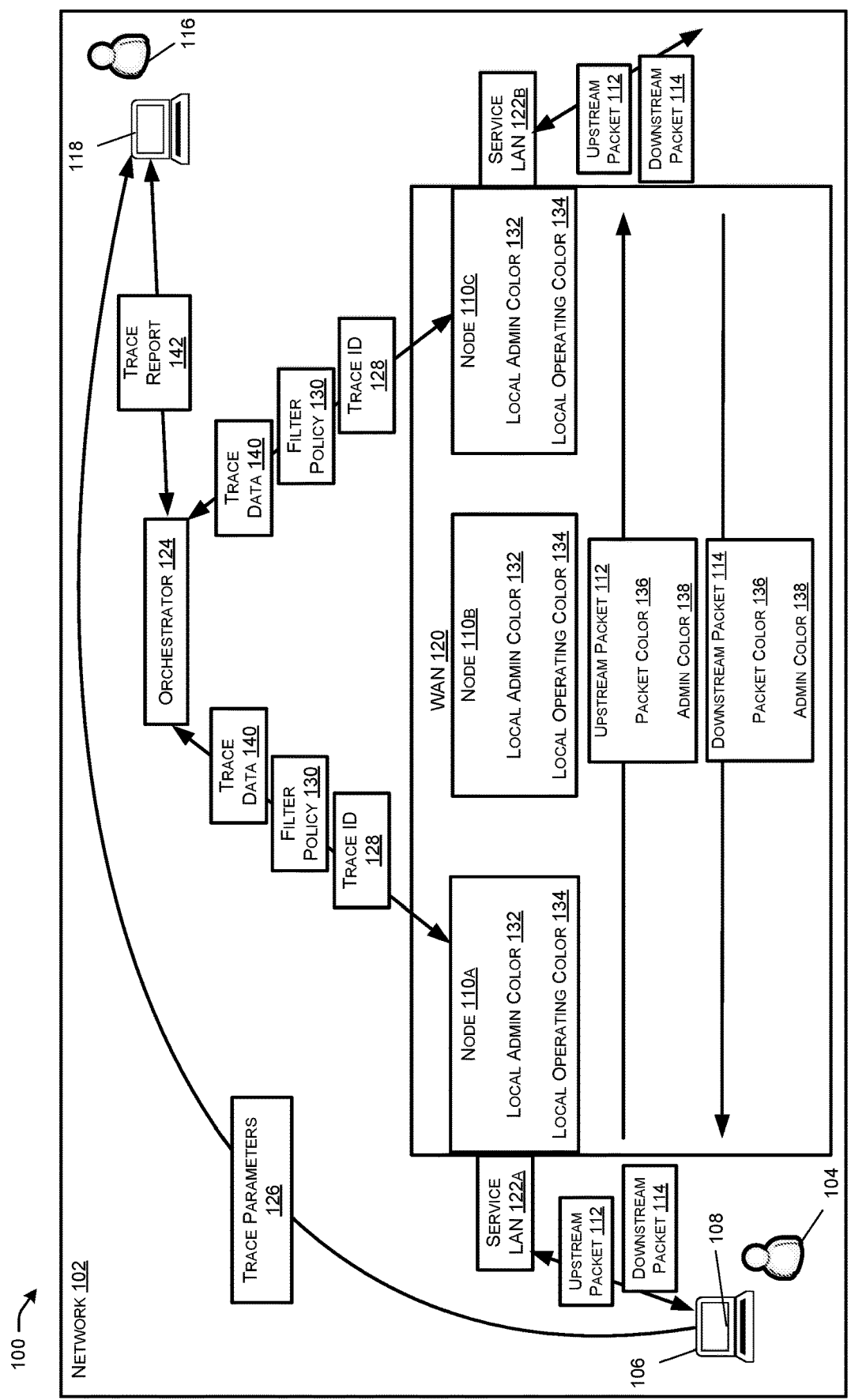
FIG. 1 schematically illustrates an example of a system for tracking packets in a network, in accordance with the techniques and architecture described herein.

The present disclosure describes techniques and architecture for tracking flows of packets in a network using a packet color marking scheme for obtaining network end-to-end traffic flow metrics in the network. In particular, in configurations, a user may be prompted to specify a site and a virtual private network (VPN) at which to start a trace for packet flows using a coloring marking scheme within the network. Given the VPN and the site, it is possible to monitor interested packet flows and apply metadata, e.g., colors, on flow packets. Remote wide area network (e.g., software defined WAN (SD-WAN)) routers receiving the packets with metadata may automatically trace the same flow and apply the same metadata to a next hop router. Hence, an end-to-end network path may be discovered.

As an example, a method within a network comprising a plurality of nodes may comprise receiving, at a first node of the plurality of nodes from a service local area network (LAN), a first packet. In configurations, the first node maintains a first local operating color field and a first local admin color field, and wherein the first packet comprises a first packet color field and a first admin color field. The method may also include marking, by the first node, the first packet color field with a first color from the first local operating color field. The method may further comprise forwarding, by the first node to a second node of the plurality of nodes, the first packet. In configurations, the second node maintains a second local operating color field and a second local admin color field. The method may additionally include changing, by the second node, the second local admin color field to a second color. The method may also include marking, by the second node, the first admin color field with the second color. The method may further include forwarding, by the second node to a third node of the plurality of nodes, the first packet. The method may additionally include based at least in part on the first admin color field, changing, by the third node, a third local admin color field maintained at the third node to the second color. The method may also include receiving, at the third node from the service LAN, a second packet comprising a second packet color field and a second admin color field. The method may further include based at least in part on receiving the second packet, changing, by the third node, a third local operating color field maintained at the third node to the second color. The method may additionally include marking, by the third node, the second packet color field with the second color. The method may also include forwarding, by the third node to the second node, the second packet. The method may further include marking, by the second node, the second admin color field with the second color. The method may additionally include forwarding, by the second node to the first node, the second packet. The method may also include changing, by the first node, the first admin color field to the second color.

Example Embodiments

In accordance with configurations, as previously noted, a user may be prompted to specify a site and a virtual private network (VPN) at which to start a trace for packet flows using a coloring marking scheme within the network. Given the VPN and the site, it is possible to monitor interested packet flows and apply metadata, e.g., colors, on flow packets. Remote wide area network (e.g., software defined WAN (SD-WAN)) routers receiving the packets with metadata may automatically trace the same flow and apply the same metadata to a next hop router. Hence, an end-to-end network path may be discovered. In configurations, a WAN router belonging to the user specified site may be referred to as a trace starting node, and all other routers discovered in the trace may be referred to as trace discovered nodes. In accordance with configurations, a color marking mechanism may operate as follows.

All nodes may maintain a local operating color in order to mark packets with colors. Any traced packet received on a service LAN interface of an edge node of a SD-WAN network) may be marked with the receiving node's (e.g., an edge router of the SD-WAN network) local operating color. The color of a packet may be carried in WAN metadata and propagate to a next-hop node. The next-hop node must not change the color of the packet and must keep on propagating the same color.

The trace starting node may operate an interval timer as a single source of time. When an interval time period is up, the trace starting node may be responsible for advertising a new color to the network. In configurations, when a node receives a packet marked with a new operating color different with respect to the node's local operating color, the node may update its local operating color to be in accordance with the new operating color.

If the trace starting node is also the edge node of the WAN network, the above steps should be adequate. However, WAN routers may act in a mixed role, i.e., they can act as an entry/exit point for some applications and at the same time act as intermediate exchange points for other applications. For example, a logical hub role may serve as a gateway of application Office365 and an exchange node of application Webex between spokes of a network. Thus, in accordance with configurations, a hierarchy is supported in WANs (e.g., SD-WANs) that introduce multiple roles to one router.

Thus, if the trace start node acts as an intermediate node in a network topology, the node receives color marked packets from trace discovered nodes that are edge nodes in the network topology. According to the above, the trace starting node must not change the color of the packets. Therefore, even if the interval time is up, the trace starting node is not able to advertise a new operating color to other nodes in the network. Accordingly, the color marking mechanism described herein additionally may operate as follows.

All nodes may maintain a local admin color and a local operating color. The trace starting node may operate an interval timer. When an interval time period is up, the trace starting node may update its admin color to a new color.

Any traced packet may be marked with two colors, one is a service LAN receiving node's local operating color while the other is an admin color. In configurations, only the trace starting node may mark packets with its local admin color. Other nodes, e.g., trace discovered nodes, may mark packets with an invalid admin color if the packet has not yet been marked with an admin color.

The trace starting node may change the admin color of a packet. Other nodes, e.g., trace discovered nodes, must not change a packet's admin color and must keep on propagating the same admin color. When a trace discovered node receives a packet with a valid admin color, the trace discovered node may update its local admin color to a new color that is the same as the admin color of the received packet.

When a packet is received on a service LAN interface of a node (e.g., an edge router of the WAN network), the node may check if its local admin color is different with respect to its local operating color. If different, may change its local operating color to be the same as the local admin color. The node may then use the new local operating color to mark the packet.

As an example, initially all nodes are operating with operating color red, e.g., the local operating color field of all nodes is red. When the interval timer is complete, the trace starting node changes its local admin color field to color black.

A first packet moving from a first trace discovered node to the trace starting node is marked with (admin color: invalid; packet color: red) in its metadata, e.g., an admin color field and a packet color field in the metadata. The trace starting node cannot change the first packet's packet color field but can update the first packet's admin color field to color black. Thus, the first packet moving from the trace starting node to a second trace discovered node is marked with (admin color: black; packet color: red). Upon receipt of the first packet, the second trace discovered node updates its local admin color to color black.

When a second packet incoming from a service LAN interface of the second trace discovered node is received by the second trace discovered node, the second trace discovered node detects the local admin color and the local operating color are different on the second trace discovered node. Accordingly, the second trace discovered node updates its local operating color field to color black to correspond with its local admin color field and starts a new monitor interval.

The second packet moves from the second trace discovered node to the trace starting node and is marked by the second trace discovered node with (admin color: invalid; packet color: black). Upon receipt of the second packet, the trace starting node updates its local operating color to color black and starts a new monitor interval. The trace starting node changes the second packet's admin color to color black. The second packet moving from the trace starting node to the first trace discovered node is marked with (admin color: black; packet color: black). Upon receipt of the second packet, the first trace discovered node updates its local admin color and local operating color to color black and starts a new monitor interval.

Thus, in configurations, a first node of a plurality of nodes within a network maintains a first local operating color field and a first local admin color field, wherein the first packet comprises a first packet color field and a first admin color field. The first node marks the first packet color field with a first color from the first local operating color field. The first node forwards the first packet to a second node. In configurations, the second node maintains a second local operating color field and a second local admin color field. The second node changes the second local admin color field to a second color. The second node marks the first admin color field with the second color. The second node forwards the first packet to a third node. Based at least in part on the first admin color field, the third node changes a third local admin color field maintained at the third node to the second color. The third node receives a second packet from the service LAN, wherein the second packet comprises a second packet color field and a second admin color field. Based at least in part on receiving the second packet, the third node changes a third local operating color field maintained at the third node to the second color. The third node marks the second packet color field with the second color. The third node forwards the second packet to the second node. The second node marks the second admin color field with the second color. The second node forwards the second packet to the first node. The first node changes the first admin color field to the second color.

In configurations, the second node maintains a timer wherein changing the second local admin color field to the second color is based at least in part on expiration of the timer. In configurations, based at least in part on receiving the second packet, the second node changes the second local operating color field to the second color.

In configurations, the first node marks the first admin color field with an invalid admin color. In configurations, the third node marks the second admin color field with an invalid admin color.

In configurations, the first color represents a first flow related to a first monitor interval and the second color represents a second flow related to a second monitor interval.

In configurations, based at least in part on receiving the second packet, the first node changes the first local operating color field to the second color. In some configurations, the first node receives a third packet from the service LAN, wherein the third packet comprises a third packet color field and a third admin color field. In some configurations, the first node marks the third admin color field with an invalid admin color.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example system 100 for tracking packets in a network. The system 100 or portions thereof may be associated with an entity, which may include any entity, such as a business or company that initiates network path traces. The components of the system 100 may include any suitable combination of hardware, firmware, and software. For example, the components of the system 100 may use one or more elements of the computer system of FIG. 4. The system 100 of FIG. 1 includes a network 102, a user 104, a user device 106, an application 108, nodes 110, an upstream packet 112, and a downstream packet 114.

The user 104 of the system 100 is any individual, group of individuals, machine, entity, and the like that interacts with user device 106. The user 104 may utilize the user device 106 to communicate with an operator 116 over the network 102 with an operator device 118. In certain configurations, the user 104 of the user device 106 interacts with the application 108. The application 108 is a software program that runs on the user device 106. The application 108 may be a video application, an audio application, a screen sharing application, a messaging application, a file sharing application, a whiteboarding application, a calling application, a web browser, an e-mail program, a word processor, a game, a combination thereof, or any other suitable application.

The user device 106 of the system 100 represents any suitable computing component that may be used to communicate information to one or more components (e.g., the operator device 118) of the system 100. The user device 106 may be a phone (e.g., a smartphone), a laptop computer, a desktop computer, a tablet, a personal digital assistant, a wearable computer, a combination thereof, or any other suitable computing component. In certain configurations, the user device 106 may have wireless network connection capabilities (e.g., WI-FI and/or BLUETOOTH capabilities). The user device 106 may include an interface (e.g., a screen, a graphical user interface (GUI), or a panel) that allows the user 104 to interact with the user device 106. The user device 106 may communicate with one or more components of the system 100 via the network 102.

The network 102 of the system 100 may be any type of network that facilitates communication between components of the system 100. The network 102 may connect one or more components of the system 100. One or more portions of the network 102 may include an ad-hoc network, an intranet, an extranet, a VPN, a local area network (LAN), a wireless LAN (WLAN), a wide area network (WAN), a wireless WAN (WWAN), an SD-WAN, a metropolitan area network (MAN), a portion of the Internet, a portion of the Public Switched Telephone Network (PSTN), a cellular telephone network, a DSL, a 3G network, a 4G network, a 5G network, a Long Term Evolution (LTE) network, a combination of two or more of these, or other suitable types of networks. The network 102 may include one or more different types of networks. The network 102 may be any communications network, such as a private network, a public network, a connection through Internet, a mobile network, a WI-FI network, etc. One or more components of the system 100 may communicate over the network 102. The network 102 may include a core network (e.g., the Internet), an access network of a service provider, an Internet service provider (ISP) network, and the like. In the illustrated configuration of FIG. 1, the network 102 includes a WAN that is configured as a software defined WAN (SD-WAN) 120. In other configurations, the WAS may not be configured as a SD-WAN. The SD-WAN is a virtual overlay network that uses tunnels to carry traffic over multiple underlay networks. The SD-WAN may be a hybrid of existing carrier services and unmanaged connections that utilize the public Internet. The network 102 also includes service LANs 122a, 122b.

In configurations, the system 100 includes an orchestrator 124 of the system 100 that represents any suitable computing component (e.g., a controller, a router, a server, etc.) that may be used to initiate network path traces for system 100. The orchestrator 124 may coordinate one or more components of the system 100 and/or facilitate communication between one or more components of the system 100. The orchestrator 124 may receive data from and/or transmit data to one or more components of the system 100. The orchestrator 124 may be located in any suitable location to process information for the system 100. In the illustrated configuration of FIG. 1, the orchestrator 124 is located within an SD-WAN environment. In certain configurations, the orchestrator 124 serves as a central controller for the network 102.

In certain configurations, orchestrator 124 receives trace parameters 126 from one or more components of system 100. For example, user 104 of user device 106 may experience a performance issue with application 108 and forward a complaint to operator device 118, and trace parameters 126 may be associated with that particular application 108 that is experiencing the performance issue. As another example, orchestrator 124 may receive a request from operator device 118 to verify the design of a deployment of a new site, VPN, and/or service within network 102, and trace parameters 126 may be associated with that particular new site, VPN, and/or service. As still another example, orchestrator 124 may receive a request from operator device 118 to periodically monitor policies utilized by network 102, and trace parameters 126 may be associated with the policies.

In certain configurations, the orchestrator 124 determines to initiate a network path trace. For example, the orchestrator 124 may determine to initiate a network path trace for application 108 in response to receiving trace parameters 126 from operator device 118. In some configurations, the orchestrator 124 allocates trace identification 128 to the network path trace. The trace identification 128 is a network-wide unique identification that is used by one or more components of the system 100 to identify a particular network path trace. The trace identification 128 may be carried by one or more packets within the network 102. In some configurations, the orchestrator 124 generates filter policy 130 for the network path trace. Filter policy 130 is a policy used by components of the system 100 to filter packets within the network 102 that belong to the application 108. In certain configurations, the orchestrator 124 translates the trace parameters 126 to generate the filter policy 130. In some configurations, the orchestrator 124 initiates the network path trace for application 108 by communicating the trace identification 128 and/or filter policy 130 to node 110.

In configurations, each node 110 within the network 102 includes a local operating color field 132 and a local admin color field 134, as will be described further herein. Packets, e.g., packets 112, 114, received at edge nodes, e.g., edge nodes 110a and 110c from the service LANs 122a, 122b, e.g., packets entering the SD-WAN 120, include a packet color field 136 that is marked by the corresponding edge node upon receipt based on the node's local operating color 132 and an admin color field 138, as will be described further herein. In configurations, the packet color field 136 may be used as a flow identification.

The nodes 110 of the system 100 represent any suitable computing components (e.g., routers, switches, servers, etc.) that can receive, create, process, store, and/or send traffic to other components within the network 102. The network 102 of the system 100 may include a plurality of nodes 110. In certain configurations, the nodes 110 are part of an SD-WAN architecture. In the illustrated configuration of FIG. 1, nodes 110 include node 110a, node 110b, and node 110c.

The node 110a is a device (e.g., a first hop device) within the SD-WAN architecture of network 102 that is nearest to the location of user device 106. The node 110a may receive packets from and/or forward packets to the user device 106 using a LAN connection of the network 102 and a LAN interface on the node 110a. The node 110a may receive packets from and/or forward packets to the nodes 110b and 110c using a WAN connection of the network 102. Thus, the node 110a functions an edge device. In certain configurations, the node 110a receives information from the orchestrator 124. For example, the node 110a may receive trace identification 128 and/or filter policy 130 from the orchestrator 124. Upon receiving the filter policy 130 from the orchestrator 124, the node 110a may activate the filter policy 130 for the network path trace identified by the trace identification 128.

In certain configurations, when filter policy 130 for the network path trace identified by trace identification 128 is activated on the node 110a, the node 110a matches the upstream packet 112 received from the user device 106 to the filter of filter policy 130. The upstream packet 112 is a collection of data that is forwarded from the user device 106 to one or more components of the network 102. The node 110a may search for an existing flow using the tuple of upstream packet 112 and create a new flow entry if no existing flow is discovered. Upon creating a new flow entry, a per trace unique flow identification is allocated for the new flow. The node 110a may trace the internal code path of the upstream packet 112 and save the internal trace results on node 110a using trace identification 128, the flow identification, and the arriving order of the upstream packet 112 as three levels of indexes.

In certain configurations, as will be discussed further herein with respect to FIG. 2, a color marking mechanism using the packet color 136 may be used to identify a flow, e.g., the packet color 136 may serve as the flow identification. In accordance with configurations, a color marking mechanism may operate as follows.

All nodes 110 may maintain a local operating color 132 in a local operating color field in order to mark packets, e.g., upstream packet 112 and downstream packet 114, with colors. Any traced packet received on a service LAN interface of an edge node of the SD-WAN 120, e.g., from the service LANs 122, may be marked with the receiving node's local operating color 132, e.g., node 110a's local operating color 132. The color of a packet may be carried in metadata and propagate to a next-hop node, e.g., either node 110b or node 110c. The next-hop node must not change the packet color 136 of the packet and must keep on propagating the same local operating color 132 and packet color 136.

A trace starting node may operate an interval timer as a single source of time. When an interval time period is up, the trace starting node 110b may be responsible for advertising a new color to the network 102, e.g., a new operating color 132, using the packet admin color 138. In configurations, when a node 110 receives a packet marked with a new admin color 138 different with respect to the node's local operating color 132, the node 110 may update its local operating color 132 to be in accordance with the new admin color 138, as well as its local admin color 134.

If the trace starting node 110b is also the edge node of the SD-WAN network 120, the above steps should be adequate. However, SD-WAN routers may act in a mixed role, i.e., they can act as an entry/exit point for some applications 108 and at the same time act as intermediate exchange points for other applications 108. Thus, nodes 110a, 110b, and 110c may act as edge routers or intermediate exchange points depending on the application 108. For example, a logical hub role may serve as a gateway of application Office365 and an exchange node of application Webex between spokes of the SD-WAN 120.

Thus, if the trace start node acts as an intermediate node in SD-WAN 120 network topology, the trace start node receives color marked packets from trace discovered nodes that are edge nodes in the SD-WAN 120 network topology. Using node 110*b* as an example trace starting node, according to the above, the trace starting node 110*b* must not change the packet color 136 of the packets. Therefore, even if an interval time is up, the trace starting node is not able to advertise a new operating color to other nodes in the network. Accordingly, the color marking mechanism described herein additionally may operate as follows.

All nodes 110 may maintain a local admin color 134 in a local admin color field and a local operating color in a local operating color field. The trace starting node may operate an interval timer. When an interval time period is up, the trace starting node may update its admin color to a new color.

Any traced packet may be marked with two colors: an edge receiving node's local operating color 132 (packet color 136) while the other is an admin color 138. In configurations, only the trace starting node may mark packets with its local admin color 134. Other nodes 110, e.g., trace discovered nodes, may mark packets with an invalid admin color if the packet has not yet been marked with an admin color.

The trace starting node may change the admin color 138 of a packet. Other nodes, e.g., trace discovered nodes, must not change a packet's admin color and must keep on propagating the same admin color. When a trace discovered node receives a packet with a valid admin color 138, the trace discovered node may update its local admin color 134 to a new color that is the same as the admin color 138 of the received packet.

When a packet is received on a service LAN interface of an edge node, the edge node may check if its local admin color is different with respect to its local operating color. If different, the edge node may change its local operating color to be the same as the local admin color. The node may then use the new local operating color to mark the received packet.

When the node 110*a* finishes processing the upstream packet 112, node 110*a* may add metadata to the overlay encapsulation. The metadata may include one or more of the following fields: a direction bit, which is used to mark a flow direction (e.g., 0 for upstream and 1 for downstream); a debug level, which is used to indicate the debug level of the network path trace; a flag, which is reserved for future use; a flow identification, which is allocated by node 110*a* to represent the flow globally; trace identification 128 which is allocated by orchestrator 124; the packet color field 136; and the admin color field 138. In configurations, as will be described herein, the packet color field may be used as the flow identification. In certain configurations, the node 110*a* initiates an encapsulation procedure to encapsulate the metadata of upstream packet 112. After encapsulating the metadata, the node 110*a* may forward the upstream packet 112 to the node 110*b*, which may then forward the upstream packet 112 to the node 110*c*.

The node 110*c* is a remote device within the SD-WAN architecture of network 102. The node 110*c* may receive packets from and/or forward packets to a device external to the SD-WAN architecture of the network 102 using a LAN connection (and an interface on the node 110*c*). The node 110*c* may receive packets from and/or forward packets to the nodes 110*a* and/or 110*b* using a WAN connection of network 102. In certain configurations, the node 110*c* is located in a different geographical region than node 110*a* and/or node 110*b*. For example, the node 110*c* may be located in a first city (e.g., Beijing, San Jose, etc.), and the node 110*a* may be located in a second city (e.g., Shanghai, New York City, etc.). The node 110*c* may receive upstream packet 112 from the node 110*a* or the node 110*b*. In certain configurations, upon receiving upstream packet 112, the node 110*c* decapsulates the metadata, reads trace identification 128 from the decapsulated metadata, and/or searches trace identification 128 in a trace result database. If the node 110*c* is unable to find a match for trace identification 128 in the trace result database, the node 110*c* may insert trace identification 128 into the trace result database. In certain configurations, the node 110*c* forwards a notification to the orchestrator 124. The notification may include information associated with the node 110*c* (e.g., a device identification), trace identification 128, etc. The information included in the notification may indicate to the orchestrator 124 that a database record for trace identification 128 is available on the node 110*c*. Upon receiving this notification from the node 110*c*, the orchestrator 124 may use the information to determine the external network path of traced upstream packet 112.

Upon receiving upstream packet 112 with the metadata added by node 110*a* and/or node 110*b*, node 110*c* may determine to internally trace upstream packet 112. In certain configurations, node 110*c* saves the internal trace result of upstream packet 112 and indexes upstream packet 112 by trace identification 128 and/or the flow identification. Node 110*c* may read the arriving order of upstream packet 112 from the metadata. In certain configurations, node 110*c* searches for the existing flow using the tuple of upstream packet 112. Node 110*c* may create a new flow entry if no existing flow entry is discovered. The flow entry created by node 110*c* may be bi-directional such that an automatic filter to match the existing flow entries may be created on the network domain edge interfaces to match downstream packets coming from outside of this network domain. Trace identification 128 and/or flow identification may be saved into the flow entry opaque data.

The node 110*c* may receive downstream packet 114 from a node (e.g., a web server) outside of network 102. Downstream packet 114 is a collection of data that is forwarded from one or more components of network 102 (e.g., node 110*c*) to user device 106. In certain configurations, node 110*c* may use the automatic filter to determine that downstream packet 114 matches an existing flow. In response to this determination, node 110*c* may initiate a trace for downstream packet 114. Trace identification 128 and/or the flow identification may be obtained from the matching flow entry's opaque data and used together with the arriving order of downstream packet 114 to index the internal trace result of downstream packet 114. Trace identification 128 and/or the flow identification may be included in the metadata fields of downstream packet 114 once downstream packet 114 proceeds to the overlay encapsulation procedure.

The node 110*c* may forward downstream packet 114 to node 110*a* or node 110*b* with trace identification 128 and/or the flow identification in the metadata. Node 110*c* sets the direction bit in the metadata of downstream packet 114 to downstream (e.g., 1 for downstream). When node 110*a* or node 110*b* receives downstream packet 114 from node 110*c*, node 110*a* or node 110*b* may determine that downstream packet 114 is downstream by reading its metadata. As such, node 110*a* or node 110*b* traces downstream packet 114 and saves the trace results. no other actions may be required for downstream packet 114.

In certain configurations, operator 116 may issue, via operator device 118, an end trace command to orchestrator 124 to request orchestrator 124 to terminate the network path trace for application 108. Upon receiving the end trace command from operator device 118, orchestrator 124 forwards a stop trace command to participating nodes 110 (e.g., node 110a, node 110b, and node 110c) of network 102 that have a trace result database record for trace identification 128. In certain configurations, orchestrator 124 may forward the stop trace command to participating nodes 110 in response to determining to end the network path trace based on a configurable interval timer. Upon receiving the stop trace command, nodes 110 may remove all filters (including those configured on node 110a and those automatically generated on node 110b and/or node 110c) so that no new packets are matched and traced. A predetermined period of time may be allowed for orchestrator 124 to receive the in-flight traced packets and/or to obtain the internal trace results from participating nodes 110.

In some configurations, filter policy 130 is configured to instruct one or more participating nodes 110 of network 102 to terminate the network path trace for application 108. For example, filter policy 130 may include a parameter that initiates the termination of the network path trace once node 110a filters a predetermined number of packets (e.g., 1 to 250 packets) in accordance with filter policy 130. In response to node 110a filtering the predetermined number of packets, participating nodes 110 may remove all filters (including those configured on node 110a and those automatically generated on nodes 110b or 110c) so that no new packets are matched and traced.

In certain configurations, orchestrator 124 receives trace data 140 associated with trace identification 128 from nodes 110 of network 102. Trace data 140 is data received from participating nodes 110 of network 102 that is associated with trace identification 128. Trace data 140 may include flow statistics for each participating node 110 of network 102, an internal trace result for each packet associated with each participating node 110, and the like. In certain configurations, orchestrator 124 may retrieve trace data 140 from the trace result database of each participating node 110. For example, orchestrator 124 may pull trace data 140 associated with trace identification 128 from the database records of the trace result databases. In certain configurations, orchestrator 124 stores trace data 140 on one central database for correlation and visualization.

The trace data 140 may include two parts: per device per flow statistics with characteristics of that flow; and per device per packet internal processing trace results. Because a flow has a per trace unique flow identification, orchestrator 124 can correlate the same flow's statistics for multiple nodes 110. Orchestrator 124 may calculate an underlay network drop using the last hop sent count minus the next hop received count. Because the internal trace result for each upstream packet 112 and each downstream packet 114 includes a flow identification, orchestrator 124 can correlate the internal trace results with flow statistics and group the internal trace results by different flows.

In certain configurations, the orchestrator 124 generates trace report 142 using trace data 140 received from participating nodes 110 of network 102. Trace report 142 is an organized collection of information showing the results of the network path trace initiated by orchestrator 124. Trace report 142 may include information associated with a flow path (e.g., a unidirectional or bi-directional flow path) for application 108 that is generated by orchestrator 124. In certain configurations, trace report 142 includes one or more of the following: a network path of each flow of the network path trace; a network location where each flow experienced packet drop; metrics associated with each flow; a total number of packets associated with each flow; a total number of bytes associated with each flow; a listing of the packets associated with each flow; and an internal trace result associated with each of the packets.

In certain configurations, the orchestrator 124 initiates a clean procedure for the trace result databases of nodes 110. The orchestrator 124 may initiate the clean procedure periodically, on-demand, and/or once trace data 140 is retrieved from nodes 110. In certain configurations, each node 110 delays the cleaning of its trace result database until trace data 140 is successfully transported to orchestrator 124 so that if the connection between node 110 and orchestrator 124 fails, orchestrator 124 can still recover the trace results by scanning the trace result database of node 110 after the connection is restored.

In operation, user 104 of user device 106 experiences a performance issue (e.g., a slow response time, a poor video quality, etc.) with application 108 (e.g., Webex Meetings). Via user device 106, user 104 forwards a complaint about the performance of application 108 to operator device 118. The complaint includes trace parameters 126 such as a site identification, a VPN identification of user 104, an IP address of user device 106, an identification of application 108 that is experiencing performance issues, and the like. Operator 116 inputs trace parameters 126 into a user interface of operator device 118 and requests orchestrator 124 to start tracing application 108 by selecting a start function on the user interface. Orchestrator 124 receives trace parameters 126 from operator device 118 and determines to initiate a network path trace for application 108. Orchestrator 124 allocates trace identification 128 to the network path trace and generates filter policy 130 for the network path trace using trace parameters 126. Orchestrator 124 binds trace identification 128 to filter policy 130 and initiates the network path trace within network 102 by communicating trace identification 128 and filter policy 130 to node 110a of network 102.

After the network path trace has been initiated (e.g., activated) within network 102, node 110a receives upstream packet 112 from user device 106. Node 110a matches upstream packet 112 to the filter of filter policy 130. Node 110a searches for an existing flow using the tuple of upstream packet 112. If no existing flow is discovered, node 110a creates a new flow entry and allocates a unique flow identification to the new flow. Node 110a traces the internal code path of upstream packet 112 and saves a trace result to a trace database stored on node 110a using trace identification 128, the flow identification, and the arriving order of upstream packet 112 as three levels of indexes.

When node 110a finishes processing upstream packet 112, node 110a adds metadata to the overlay encapsulation of upstream packet 112. The metadata includes the following fields: a direction bit, a debug level, a flag, a flow identification, and trace identification 128. Node 110a then forwards upstream packet 112 to one of nodes 110b or 110c (receiving node). When one of nodes 110b or 110c of network 102 receives upstream packet 112, the receiving node 110 decapsulates the metadata and reads trace identification 128. The receiving node 110 searches trace identification 128 in a trace result database. If the receiving node 110 does not discover a match, the receiving node 110 inserts trace identification 128 into its trace result database and forwards a notification to orchestrator 124 of network 102. The notification includes an identification of the receiving node 110 and trace identification 128. Orchestrator 124 uses the information in the notification to determine the network path flow of upstream packet 112.

The receiving node 110 saves the trace result of upstream packet 112 in its trace result database and indexes trace identification 128 and the flow identification. The receiving node 110 reads the arriving order of upstream packet 112 from the metadata. The receiving node 110 searches for the existing flow using the tuple of upstream packet 112. If no existing flow entry is found, the receiving node 110 creates a new flow entry. The created flow entry may be bi-directional such that an automatic filter that matches the existing flow entries can be set up on the network domain edge interfaces to match downstream packets coming from outside the network domain. Trace identification 128 and the flow identification are saved into the flow entry opaque data.

When downstream packet 114 arrives at the node 110c, the node 110c determines that the downstream packet 114 matches an existing flow using the automatic filter. Based on this determination, the node 110c determines to trace downstream packet 114. The node 110c obtains trace identification 128 and the flow identification from the matching flow entry's opaque data and uses this information together with the arriving order of downstream packet 114 to index the internal trace result of downstream packet 114. The same trace identification 128 and flow identification are included in the metadata fields once downstream packet 114 proceeds to overlay encapsulation.

The downstream packet 114 is forwarded back to one of nodes 110a or 110b (receiving node) with the same trace identification 128 and flow identification in the metadata and the direction bit in the metadata set to downstream. When the receiving node 110 receives downstream packet 114, the receiving node 110a determines that downstream packet 114 is downstream by reading the metadata. The receiving node 110 traces downstream packet 114 and saves the trace results in its trace result database.

This process described with respect to FIG. 1 is repeated until operator 116 of operator device 118 forwards an end trace command to orchestrator 124. Once orchestrator 124 receives the end trace command, orchestrator 124 forwards a stop trace command for trace identification 128 to node 110a, node 110b, and any other nodes 110 that have a trace result database record for trace identification 128. Upon receiving the stop trace command, all filters (including those configured on nodes 110a and those automatically generated on node 110b) are removed so no new packets are matched and traced. Orchestrator 124 retrieves trace data 140 for trace identification 128 from the trace result database of each participating node 110 and stores trace data 140 on one central database for correlating and visualization. Orchestrator 124 generates trace report 142 for application 108 using trace data 140. Trace report 142 includes a flow path (e.g., a unidirectional or a bi-directional flow path) for application 108 within network 102. Orchestrator 124 forwards trace report 142 to the user interface of operator device 118. Orchestrator 124 initiates a clean procedure for the trace result databases on participating nodes 110. As such, system 100 utilizes orchestrator 124 to push filter policy 130 together with trace identification 128 to node 110a for on-demand tracing without the need to simulate forwarding decisions, which introduces minimal or no overhead to normal usage.

Although FIG. 1 illustrates a particular arrangement of network 102, user 104, user device 106, application 108, operator 116, operator device 118, orchestrator 124, nodes 110, upstream packet 112, downstream packet 114, trace parameters 126, trace identification 128, filter policy 130, trace data 140, and trace report 142, this disclosure contemplates any suitable arrangement of network 102, user 104, user device 106, application 108, operator 116, operator device 118, orchestrator 124, nodes 110, upstream packet 112, downstream packet 114, trace parameters 126, trace identification 128, filter policy 130, trace data 140, and trace report 142.

Although FIG. 1 illustrates a particular number of networks 102, users 104, user devices 106, applications 108, operators 116, operator devices 118, orchestrators 124, nodes 110, upstream packets 112, downstream packets 114, trace parameters 126, trace identifications 128, filter policies 130, trace data 140, and trace reports 142, this disclosure contemplates any suitable number of networks 102, users 104, user devices 106, applications 108, operators 116, operator devices 118, orchestrators 124, nodes 110, upstream packets 112, downstream packets 114, trace parameters 126, trace identifications 128, filter policies 130, trace data 140, and trace reports 142. For example, system 100 may include more than one filter policy 130 and/or more than three nodes 110.

Figure 2:
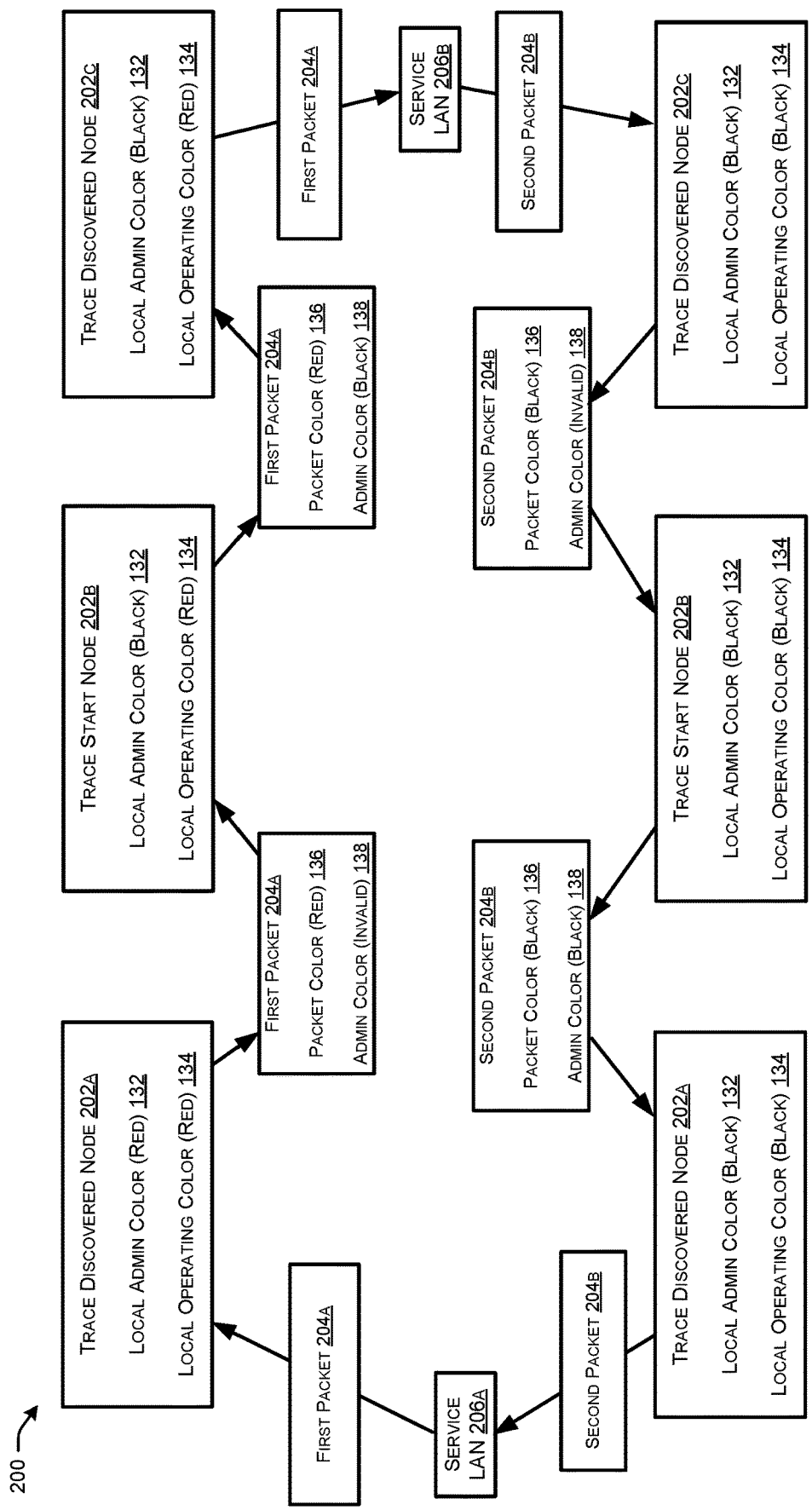
FIG. 2 schematically illustrates an example of three nodes within the network of FIG. 1 that monitor flows of packets using a color marking scheme, in accordance with the techniques and architecture described herein.

FIG. 2 schematically illustrates three nodes 202a, 202b, and 202c within a network 200, e.g., network 102. The first node 202a may be referred to as a first trace discovered node 202a (edge), e.g., corresponding to node 110a of FIG. 1. The second node 202b may be referred to as a trace starting node 202b, e.g., corresponding to node 110b of FIG. 1. The third node 202c may be referred to as a second trace discovered node 202c (edge), e.g., corresponding to node 110c of FIG. 1. The trace starting node 202b may be selected by the user 104. The trace discovered nodes 202a, 202c may be discovered during a trace.

As an example of monitoring a flow of packets using a color marking scheme using nodes of a network as previously described, the trace starting node 202b may decide to start a new time interval for monitoring a flow of packets during a trace. Thus, when a first packet 204 arrives at the first trace discovered node 202a at the edge of network 200 from a service LAN 206a, e.g., service LAN 122a. The first trace discovered node 202a may mark the packet color field of the first packet 204a with the first trace discovered node's local operating color which, in this example is red. The first trace discovered node local admin color is red but the admin color field of the first packet 204a may be marked invalid by the first discovered node 202a since in configurations, only the trace starting node 202b may mark a packet's admin color field with a color. The first trace discovered node 202a may then forward the first packet 204a to the trace starting node 202b. The first packet 204a may be forwarded along an SD-WAN tunnel.

The trace starting node 202b receives the first packet 204a and having decided to start a new flow interval for monitoring of packets, may mark the first packet admin color field with anew admin color, e.g., black. The trace starting node 202b is not allowed to change the packet color of the first packet 204a. The trace starting node 202b forwards the first packet 204a to the second trace discovered node 202c along an SD-WAN tunnel.

The second trace discovered node 202c may determine that the admin color of the packet 204a is black, which does not correspond to the local admin color of the second trace discovered node 202c, which is currently red. Accordingly, the second trace discovered node 202c may change its local admin color to black. The second trace discovered node 202c then forwards the first packet 204 via a service LAN interface to a service LAN 206b, e.g., service LAN 122b, out of the network 200.

When a second packet 204b arrives at the second trace discovered node 2202c from the service LAN 206b, the trace discovered node 202c notices that the current local admin color field (black) of the second discovered trace node 202c does not match the current local operating color field (red) of the second discovered trace node 202c. Thus, the second trace discovered node 202c may change its local operating color to correspond to its current local admin color field, which is in this example is black. The second trace discovered node 202c may then mark the second packet color field of the second packet 204b as black in accordance with the second trace discovered node's local operating color of black. The second trace discovered node 202c may mark the second packet's admin color field as invalid.

The second trace discovered node 202c then forwards the second packet 204b to the trace starting node 202b. The second packet is forwarded along the SD-WAN tunnel. The trace starting node 202b notices that the packet color of the second packet 204b is black and changes its local operating color to black accordingly. The trace starting node 202b then marks the second packet's local admin color field as black and forwards the second packet 204b along the SD-WAN tunnel to the first trace discovered node 202a.

The first trace discovered node 202a receives the second packet 204b and notices that the packet's local admin color is black. Accordingly, the first trace discovered node 202a changes its local admin color field to black and may also change its local operating color to black. The first trace discovered node 202a then forwards the second packet 204b on to the service LAN 206a via the service LAN interface of the first trace discovered node 202a.

When a third or subsequent packet (not illustrated) arrives at either trace discovered node 202a, 202c from the service LANs 206a, 206b, the trace discovered nodes 202a, 202c mark the packet's color fields with their corresponding local color fields as described herein. The trace starting node 202b may operate an interval timer and when the interval timer indicates that a flow interval is finished and it is time to start a new flow monitoring session, the trace starting node 202b may change its local admin color to a new color as previously and the process described herein may repeat itself. The packet color marking scheme may be used for obtaining network end-to-end traffic flow metrics in the network 200 based on the packets and their corresponding colors during an interval.

Figure 3A:
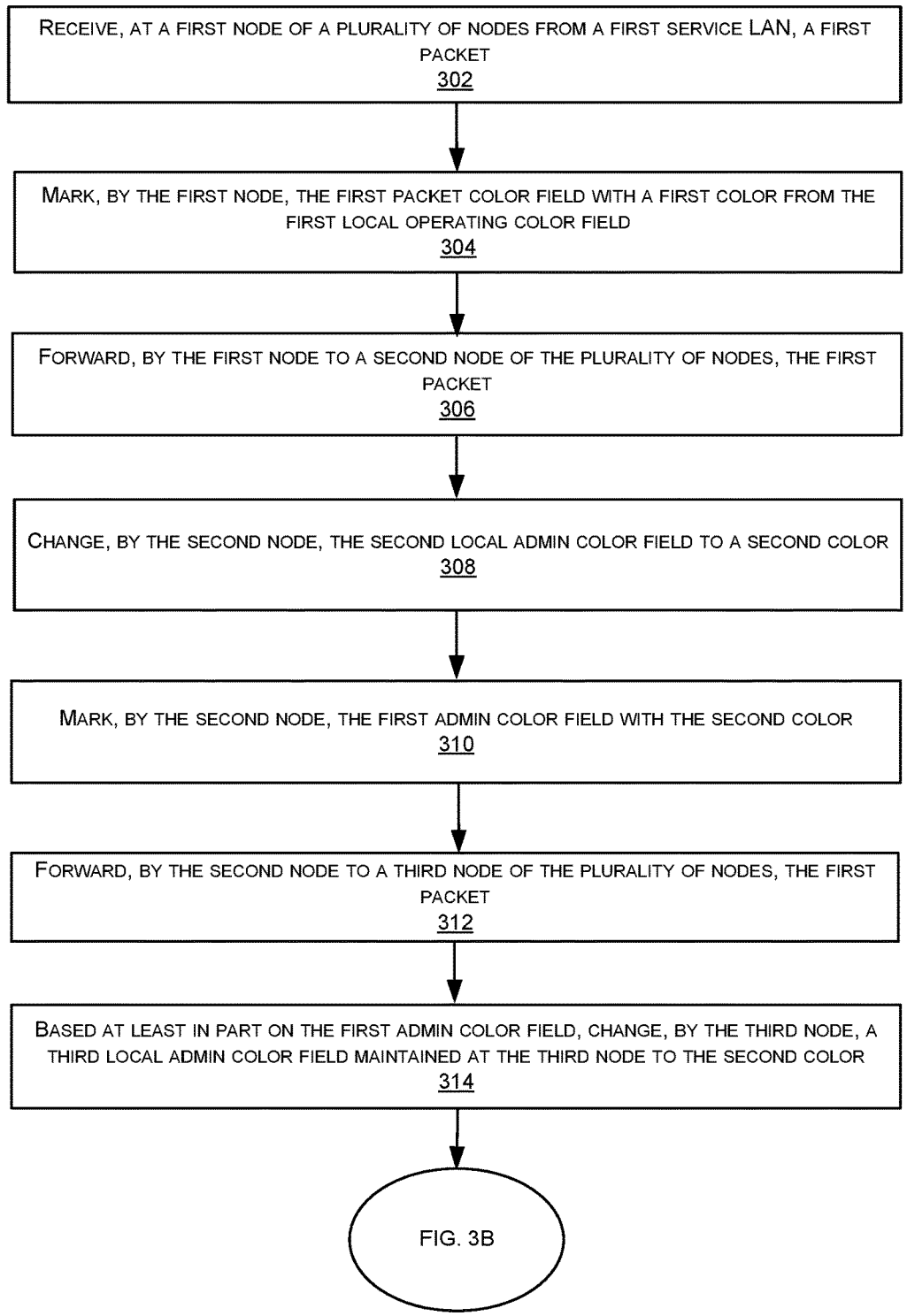
FIGS. 3A and 3B illustrate a flow diagram of an example method for using a packet color marking scheme for obtaining network end-to-end traffic flow metrics in a network, in accordance with the techniques and architecture described herein.
Figure 3B:
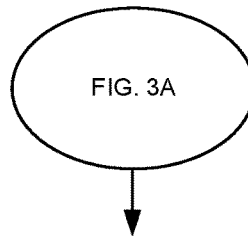

FIGS. 3A and 3B illustrate a flow diagram of an example method 300 and illustrates aspects of the functions performed at least partly by network devices of a network as described with respect to FIGS. 1 and 2. The logical operations described herein with respect to FIGS. 3A and 3B may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3A and 3B and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIGS. 3A and 3B illustrate a flow diagram of an example method 300 for using a packet color marking scheme for obtaining network end-to-end traffic flow metrics in a network, e.g., networks 102 and 200. The packet color marking scheme of example method 300 may be used for obtaining network end-to-end traffic flow metrics in the networks 102 and 200 based on the packets and their corresponding colors during an interval. In some examples, the method 300 may be performed by a system comprising one or more processors and one or more non-transitory computer-readable media storing computer-executable instructions that, when executed by the one or more processors, cause the one or more processors to perform the method 400.

At 302, a first node of a plurality of nodes receives, from a first service local area network (LAN), a first packet. In configurations, the first node maintains a first local operating color field and a first local admin color field. In configurations, the first packet comprises a first packet color field and the first admin color field. For example, a first packet 204 arrives at the first trace discovered node 202a at the edge of network 200 from a service LAN 206a, e.g., service LAN 122a. The first trace discovered node 202a may then forward the first packet 204a to the trace starting node 202b. The first packet 204a may be forwarded along an SD-WAN tunnel 208a.

At 304, the first node marks the first packet color field with a first color from the first local operating color field. For example, the first trace discovered node 202a may mark the packet color field of the first packet 204a with the first trace discovered node's local operating color which, in an example is red. The first trace discovered node local admin color is red but the admin color field of the first packet 204a may be marked invalid by the first discovered node 202a since in configurations, only the trace starting node 202b may mark a packet's admin color field with a color.

At 306, the first node forwards the first packet to a second node of the plurality of nodes. The second node maintains a second local operating color field and a second local admin color field. For example, the first trace discovered node 202a may then forward the first packet 204a to the trace starting node 202b. The first packet 204a may be forwarded along an SD-WAN tunnel 208a.

At 308, the second node changes the second local admin color field to a second color. At 310, the second node marks the first admin color field with the second color. For example, when the trace starting node 202b receives the first packet 204a and has decided to start a new flow interval for monitoring of packets, the trace starting node 202b may mark the first packet admin color field with a new admin color, e.g., black. The trace starting node 202b is not allowed to change the packet color of the first packet 204a.

At 312, the second node forwards the first packet to a third node of the plurality of nodes. For example, the trace starting node 202b forwards the first packet 204a to the second trace discovered node 202c along an SD-WAN tunnel 208b.

At 314, based at least in part on the first admin color field, the third node changes a third local admin color field maintained at the third node to the second color. For example, the second trace discovered node 202c may determine that the admin color of the packet 204a is black, which does not correspond to the local admin color of the second trace discovered node 202c, which is currently red. Accordingly, the second trace discovered node 202c may change its local admin color to black. The second trace discovered node 202c then forwards the first packet 204 via a service LAN interface to a service LAN 206b, e.g., service LAN 122b, out of the network 200.

At 316, the third node receives a second packet from a second service LAN. The second packet comprises a second packet color field and a second admin color field. At 318, based at least in part on receiving the second packet, the third node changes a third local operating color field maintained at the third node to the second color. For example, when a second packet 204b arrives at the second trace discovered node 2202c from the second service LAN 206b, the trace discovered node 202c notices that the current local admin color field (black) of the second discovered trace node 202c does not match the current local operating color field (red) of the second discovered trace node 202c. Thus, the second trace discovered node 202c may change its local operating color to correspond to its current local admin color field, which is in this example is black.

At 320, the third node marks the second packet color field with the second color. For example, the second trace discovered node 202c may then mark the second packet color field of the second packet 204b as black in accordance with the second trace discovered node's local operating color of black. The second trace discovered node 202c may mark the second packet's admin color field as invalid.

At 322, the third node forwards the second packet to the second node. For example, the second trace discovered node 202c then forwards the second packet 204b to the trace starting node 202b. The second packet is forwarded along the SD-WAN tunnel 208b.

At 324, the second node marks the second admin color field with the second color. For example, the trace starting node 202b notices that the packet color of the second packet 204b is black and changes its local operating color to black accordingly. The trace starting node 202b then marks the second packet's local admin color field as black.

At 326, the second node forwards the second packet to the first node. For example, the trace starting node 202b forwards the second packet 204b along the SD-WAN tunnel 208a to the first trace discovered node 202a.

At 328, the first node changes the first admin color field to the second color. For example, the first trace discovered node 202a receives the second packet 204b and notices that the packet's local admin color is black. Accordingly, the first trace discovered node 202a changes its local admin color field to black and may also change its local operating color to black.

Thus, the techniques and architecture described herein allow for tracking flows of packets in a network using a packet color marking scheme for obtaining network end-to-end traffic flow metrics in the network. In particular, in configurations, a user may be prompted to specify a site and a virtual private network (VPN) at which to start a trace for packet flows using a coloring marking scheme within the network. Given the VPN and the site, it is possible to monitor interested packet flows and apply metadata, e.g., colors, on flow packets. Remote wide area network (e.g., software defined WAN (SD-WAN)) routers receiving the packets with metadata may automatically trace the same flow and apply the same metadata to a next hop router. Hence, an end-to-end network path may be discovered.

Figure 4:
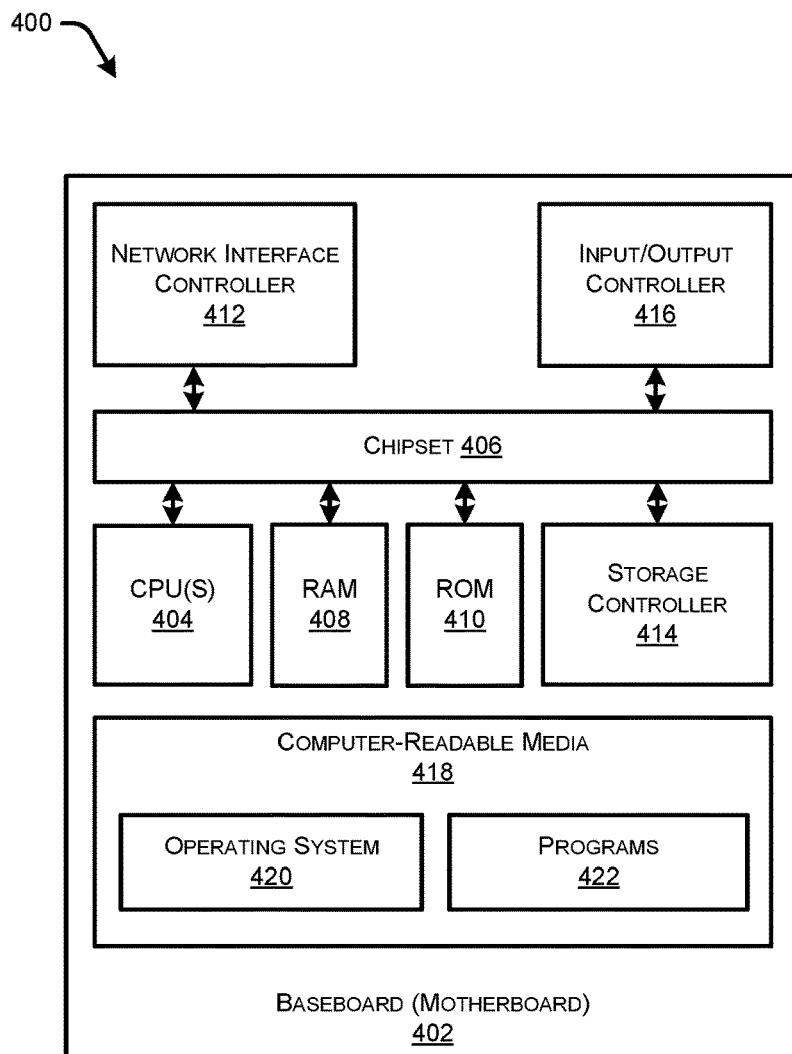
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1, 2, 3A and 3B. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the network 102. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1, 2, 3A, and 3B. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method within a network comprising a plurality of nodes, the method comprising:
   receiving, at a first node of the plurality of nodes from a first service local area network (LAN), a first packet, wherein the first node maintains a first local operating color field and a first local admin color field, and wherein the first packet comprises a first packet color field and a first admin color field;
   marking, by the first node, the first packet color field with a first color from the first local operating color field;
   forwarding, by the first node to a second node of the plurality of nodes, the first packet, wherein the second node maintains a second local operating color field and a second local admin color field;

changing, by the second node, the second local admin color field to a second color;
marking, by the second node, the first admin color field with the second color;
forwarding, by the second node to a third node of the plurality of nodes, the first packet;
based at least in part on the first admin color field, changing, by the third node, a third local admin color field maintained at the third node to the second color;
receiving, at the third node from a second service LAN, a second packet comprising a second packet color field and a second admin color field;
based at least in part on receiving the second packet, changing, by the third node, a third local operating color field maintained at the third node to the second color;
marking, by the third node, the second packet color field with the second color;
forwarding, by the third node to the second node, the second packet;
marking, by the second node, the second admin color field with the second color;
forwarding, by the second node to the first node, the second packet; and
changing, by the first node, the first admin color field to the second color.

2. The method of claim 1, further comprising:
maintaining, by the second node, a timer,
wherein changing the second local admin color field to the second color is based at least in part on expiration of the timer.

3. The method of claim 1, further comprising:
based at least in part on receiving the second packet, changing, by the second node, the second local operating color field to the second color.

4. The method of claim 1, further comprising:
marking, by the first node, the first admin color field with an invalid admin color.

5. The method of claim 1, further comprising:
marking, by the third node, the second admin color field with an invalid admin color.

6. The method of claim 1, wherein:
the first color represents a first flow related to a first monitor interval; and
the second color represents a second flow related to a second monitor interval.

7. The method of claim 1, further comprising:
based at least in part on receiving the second packet, changing, by the first node, the first local operating color field to the second color.

8. The method of claim 7, further comprising:
receiving, at the first node from the service LAN, a third packet comprising a third packet color field and a third admin color field; and
marking, by the first node, the third packet color field with the second color from the first local operating color field.

9. The method of claim 8, further comprising:
marking, by the first node, the third admin color field with an invalid admin color.

10. A system comprising:
one or more processors; and
one or more non-transitory computer-readable media storing computer-executable instructions that, when executed by the one or more processors, cause the one or more processors to perform actions comprising:
receiving, at a first node of a plurality of nodes from a first service local area network (LAN), a first packet, wherein the first node maintains a first local operating color field and a first local admin color field, and wherein the first packet comprises a first packet color field and a first admin color field;
marking, by the first node, the first packet color field with a first color from the first local operating color field;
forwarding, by the first node to a second node of the plurality of nodes, the first packet, wherein the second node maintains a second local operating color field and a second local admin color field;
changing, by the second node, the second local admin color field to a second color;
marking, by the second node, the first admin color field with the second color;
forwarding, by the second node to a third node of the plurality of nodes, the first packet;
based at least in part on the first admin color field, changing, by the third node, a third local admin color field maintained at the third node to the second color;
receiving, at the third node from a second service LAN, a second packet comprising a second packet color field and a second admin color field;
based at least in part on receiving the second packet, changing, by the third node, a third local operating color field maintained at the third node to the second color;
marking, by the third node, the second packet color field with the second color;
forwarding, by the third node to the second node, the second packet;
marking, by the second node, the second admin color field with the second color;
forwarding, by the second node to the first node, the second packet; and
changing, by the first node, the first admin color field to the second color.

11. The system of claim 10, wherein the actions further comprise:
maintaining, by the second node, a timer,
wherein changing the second local admin color field to the second color is based at least in part on expiration of the timer.

12. The system of claim 10, wherein the actions further comprise:
based at least in part on receiving the second packet, changing, by the second node, the second local operating color field to the second color.

13. The system of claim 10, wherein the actions further comprise:
marking, by the first node, the first admin color field with an invalid admin color.

14. The system of claim 10, wherein the actions further comprise:
marking, by the third node, the second admin color field with an invalid admin color.

15. The system of claim 10, wherein:
the first color represents a first flow related to a first monitor interval; and
the second color represents a second flow related to a second monitor interval.

16. The system of claim 10, wherein the actions further comprise:
based at least in part on receiving the second packet, changing, by the first node, the first local operating color field to the second color.

17. The system of claim 16, wherein the actions further comprise:
receiving, at the first node from the service LAN, a third packet comprising a third packet color field and a third admin color field; and
marking, by the first node, the third packet color field with the second color from the first local operating color field.

18. The system of claim 17, wherein the actions further comprise:
marking, by the first node, the third admin color field with an invalid admin color.

19. One or more non-transitory computer-readable media storing computer-executable instructions that, when executed by one or more processors, cause the one or more processors to perform actions comprising:
receiving, at a first node of a plurality of nodes from a first service local area network (LAN), a first packet, wherein the first node maintains a first local operating color field and a first local admin color field, and wherein the first packet comprises a first packet color field and a first admin color field;
marking, by the first node, the first packet color field with a first color from the first local operating color field;
forwarding, by the first node to a second node of the plurality of nodes, the first packet, wherein the second node maintains a second local operating color field and a second local admin color field;
changing, by the second node, the second local admin color field to a second color;
marking, by the second node, the first admin color field with the second color;
forwarding, by the second node to a third node of the plurality of nodes, the first packet;
based at least in part on the first admin color field, changing, by the third node, a third local admin color field maintained at the third node to the second color;
receiving, at the third node from a second service LAN, a second packet comprising a second packet color field and a second admin color field;
based at least in part on receiving the second packet, changing, by the third node, a third local operating color field maintained at the third node to the second color;
marking, by the third node, the second packet color field with the second color;
forwarding, by the third node to the second node, the second packet;
marking, by the second node, the second admin color field with the second color;
forwarding, by the second node to the first node, the second packet; and
changing, by the first node, the first admin color field to the second color.

20. The one or more non-transitory computer-readable media of claim 19, wherein the actions further comprise:
maintaining, by the second node, a timer,
wherein changing the second local admin color field to the second color is based at least in part on expiration of the timer.

* * * * *